United States Patent
Sakurai et al.

(10) Patent No.: US 10,920,648 B2
(45) Date of Patent: Feb. 16, 2021

(54) DETERMINATION METHOD FOR EXHAUST GAS TREATMENT DEVICE AND DETERMINATION SYSTEM FOR EXHAUST GAS TREATMENT DEVICE

(71) Applicant: KOMATSU LTD., Tokyo (JP)

(72) Inventors: Yuuta Sakurai, Tokyo (JP); Tatsushi Itou, Tokyo (JP); Yuuki Kasaoka, Tokyo (JP); Tetsuo Ohnishi, Tokyo (JP); Yu Ninomiya, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 16/609,343

(22) PCT Filed: Aug. 28, 2018

(86) PCT No.: PCT/JP2018/031811
§ 371 (c)(1),
(2) Date: Oct. 29, 2019

(87) PCT Pub. No.: WO2019/044849
PCT Pub. Date: Mar. 7, 2019

(65) Prior Publication Data
US 2020/0049045 A1 Feb. 13, 2020

(30) Foreign Application Priority Data
Aug. 31, 2017 (JP) .............................. JP2017-166540

(51) Int. Cl.
*B01D 35/143* (2006.01)
*F01N 11/00* (2006.01)
(Continued)

(52) U.S. Cl.
CPC .......... *F01N 11/002* (2013.01); *B01D 35/143* (2013.01); *B01D 46/009* (2013.01);
(Continued)

(58) Field of Classification Search
CPC .......................... B01D 35/143; B01D 46/0086; B01D 46/009; B01D 2201/52; B01D 2201/56;
(Continued)

(56) References Cited

U.S. PATENT DOCUMENTS

2002/0012623 A1    1/2002 Gobel et al.
2008/0059116 A1*   3/2008 Johansson .............. G07C 5/006
                                                       702/182
(Continued)

FOREIGN PATENT DOCUMENTS

JP    2002-47919 A    2/2002
JP    2002-122049 A   4/2002
(Continued)

OTHER PUBLICATIONS

The International Search Report for the corresponding international application No. PCT/JP2018/031811, dated Dec. 4, 2018.
(Continued)

*Primary Examiner* — Jonathan R Matthias
(74) *Attorney, Agent, or Firm* — Global IP Counselors, LLP (57) ABSTRACT

A determination method is for an exhaust gas treatment device mounted in a work machine and having at least one of a diesel oxidation catalyst and a catalyzed soot filter. The determination method includes acquiring heat damage information, acquiring cumulative heat damage information, and determining a usability of the exhaust gas treatment device based on the cumulative heat damage information. The heat damage information indicates an extent of heat damage of the exhaust gas treatment device based on a unique identification symbol of the exhaust gas treatment device. The cumulative heat damage information is acquired by accumulating the heat damage information.

4 Claims, 6 Drawing Sheets

(51) Int. Cl.
  *B01D 46/00* (2006.01)
  *F01N 9/00* (2006.01)
  *F01N 3/035* (2006.01)
  *F01N 3/10* (2006.01)
  *F01N 3/18* (2006.01)

(52) U.S. Cl.
  CPC .............. *F01N 9/007* (2013.01); *F01N 11/00* (2013.01); *B01D 46/0086* (2013.01); *B01D 2201/52* (2013.01); *B01D 2201/56* (2013.01); *F01N 3/035* (2013.01); *F01N 3/106* (2013.01); *F01N 3/18* (2013.01); *F01N 2550/04* (2013.01); *F01N 2560/06* (2013.01)

(58) Field of Classification Search
  CPC .......... F01N 9/002; F01N 9/007; F01N 11/00; F01N 11/002; F01N 11/005; F01N 2550/04; F01N 2900/1602
  See application file for complete search history.

(56) References Cited

U.S. PATENT DOCUMENTS

| | | | |
|---|---|---|---|
| 2010/0115920 | A1* | 5/2010 | Bloms .................... F01N 11/00 60/277 |
| 2011/0004559 | A1 | 1/2011 | Shibamori et al. |
| 2016/0237873 | A1 | 8/2016 | Fujie et al. |

FOREIGN PATENT DOCUMENTS

| | | |
|---|---|---|
| JP | 2002-195056 A | 7/2002 |
| JP | 2011-14003 A | 1/2011 |
| JP | 2015-71991 A | 4/2015 |
| JP | 2015-223583 A | 12/2015 |

OTHER PUBLICATIONS

The Office Action of the corresponding Japanese application No. 2017-166540, dated Dec. 22, 2020.

\* cited by examiner

DETERMINATION METHOD FOR EXHAUST GAS TREATMENT DEVICE AND DETERMINATION SYSTEM FOR EXHAUST GAS TREATMENT DEVICE

CROSS-REFERENCE TO RELATED APPLICATIONS

This application is a U.S. National stage application of International Application No. PCT/JP2018/031811, filed on Aug. 28, 2018. This U.S. National stage application claims priority under 35 U.S.C. § 119(a) to Japanese Patent Application No. 2017-166540, filed in Japan on Aug. 31, 2017, the entire contents of which are hereby incorporated herein by reference.

BACKGROUND

Field of the Invention

The present invention relates to a determination method for an exhaust gas treatment device and a determination system for an exhaust gas treatment device.

Background Information

Work vehicles such as hydraulic excavators, wheel loader, or dump trucks are provided with an exhaust gas treatment device that includes a diesel oxidation catalyst (indicated below as DOC) in order to process particulate matter (indicated below as PM) included in the exhaust gas from a diesel engine.

Soot and ash are included in the PM. While the soot is removed by promoting combustion due to the catalyst action of the diesel oxidation catalyst, combustion by itself cannot sufficiently removed the soot. Ash is the burned leftover of metallic additives included in the engine oil or the like but cannot be removed by combustion even by heating a filter.

As a result, it is necessary to take the exhaust gas treatment device out of the work machine and periodically perform maintenance to remove clogging caused by the PM (see Japanese Patent Laid-open No. 2011-014003).

SUMMARY

However, when the exhaust gas treatment device is exposed to high temperatures for a long time and suffers heat damage, the catalyst agglomerates, processability is reduced, and the of the exhaust gas treatment device cannot be used, whereby it becomes necessary to discard the exhaust gas treatment device the processing performance of which has deteriorated.

However, it is difficult to accurately determine the usability of the exhaust gas treatment device because it is not easy to quantitatively understand the extent of heat damage of the exhaust gas treatment device.

In particular, because an exhaust gas treatment device that has been subjected to periodic maintenance is often mounted in a work machine different from the work machine on which the device was previously mounted, it is difficult to accurately determine the usability of the exhaust gas treatment device when taking into account the extent of the cumulative heat damage.

An object of the present invention is to provide a technique for accurately determining the usability of an exhaust gas treatment device.

A determination method for an exhaust gas treatment device according to the present invention includes: an acquisition step for acquiring heat damage information which indicates an extent of heat damage of the exhaust gas treatment device mounted in a work machine and having at least one of a diesel oxidation catalyst and a catalyzed soot filter, on the basis of a unique identification symbol of the exhaust gas treatment device, and acquiring cumulative heat damage information by accumulating the heat damage information; and a determination step for determining an usability of the exhaust gas treatment device on the basis of the cumulative heat damage information.

According to the present invention, there can be provided a determination method for an exhaust gas treatment device and a determination system for an exhaust gas treatment device that can accurately determine the usability of an exhaust gas treatment device.

DETAILED DESCRIPTION OF EMBODIMENT(S)

Overall Configuration of Determination System for Exhaust Gas Treatment Device

Figure 1:
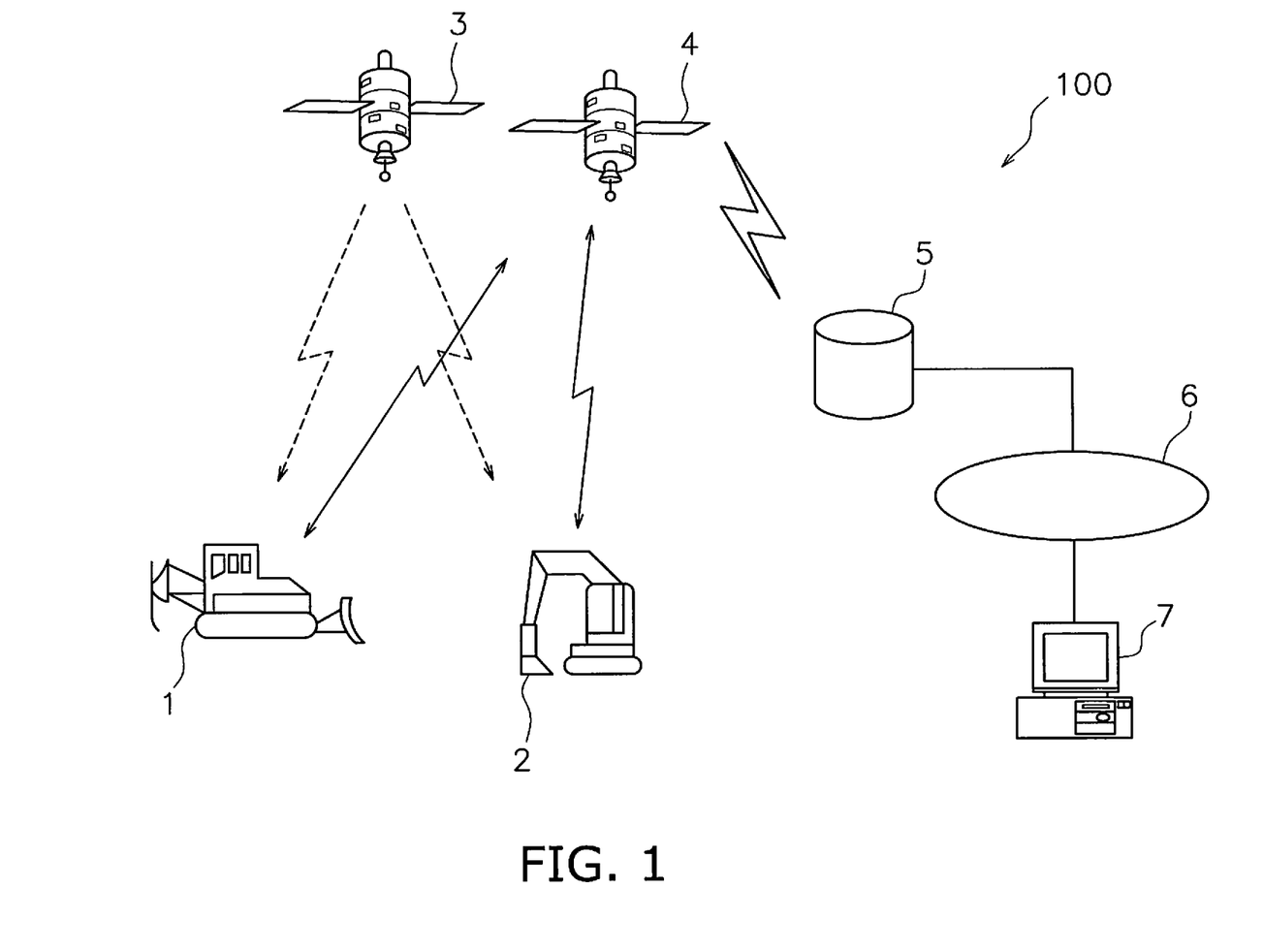
FIG. 1 is a schematic view illustrating an overall configuration of a determination system for an exhaust gas treatment device.

FIG. 1 is a schematic view illustrating an overall configuration of a determination system 100 for an exhaust gas treatment device according to the present embodiment.

The determination system 100 comprises a first work machine 1, a second work machine 2, a GPS satellite 3, a communication satellite 4, a data server 5, a network 6, and a terminal computer 7.

First and Second Work Machines 1, 2

Figure 2:
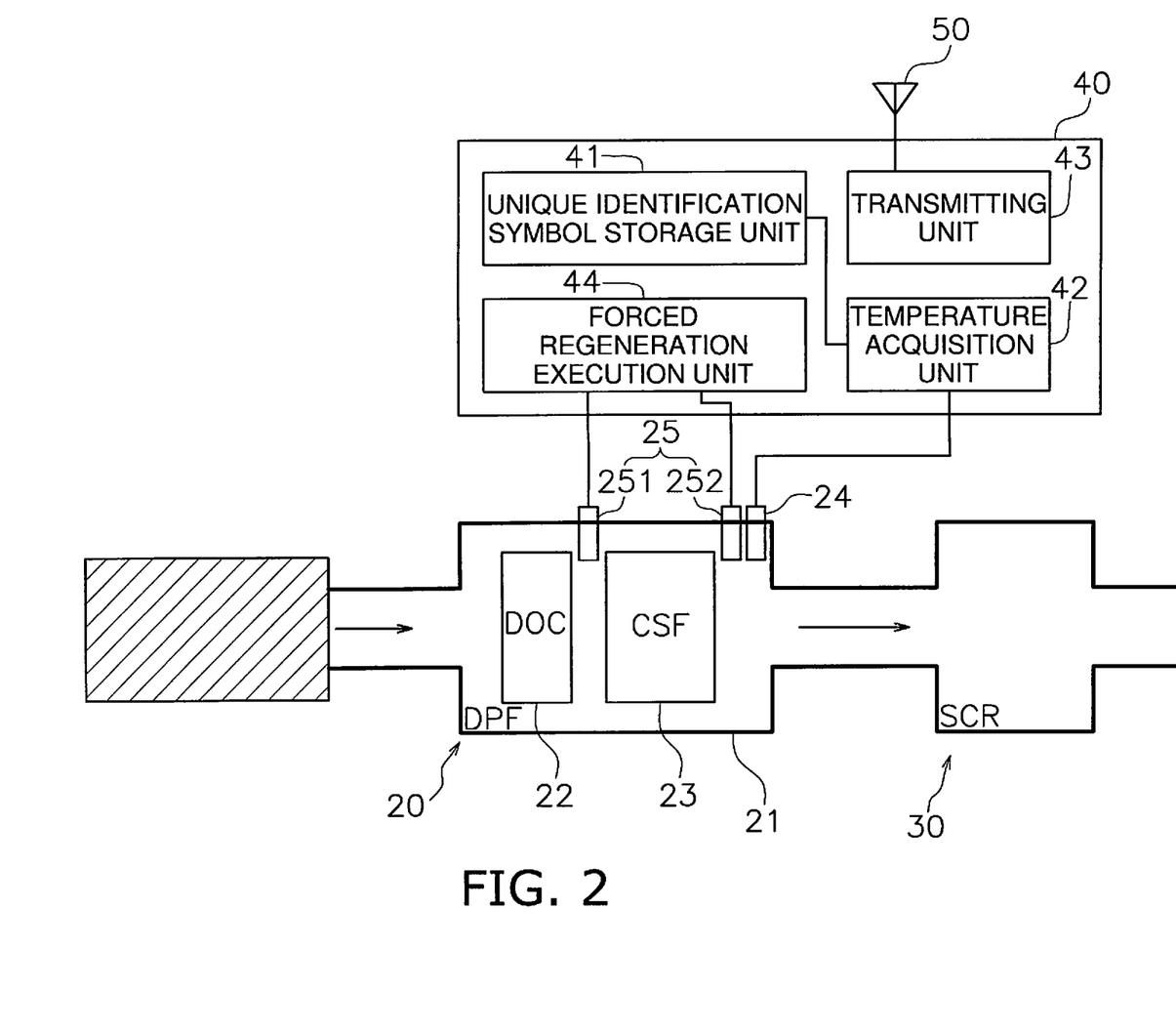
FIG. 2 is a schematic view illustrating configurations of first and second work machines.

FIG. 2 is a schematic view illustrating a portion of a configuration of each of the first and second work machines 1 and 2.

Each of the first and second work machines 1 and 2 are vehicles for performing work such as excavating, leveling, earth and sand transport, or the like at a construction site such as a mine or a road. Each of the first and second work machines 1 and 2 are, for example, a hydraulic excavator, a wheel loader, a bulldozer, a motor grader, a crane, a forklift, or the like.

As illustrated in FIG. 2, each of the first and second work machines 1 and 2 are provided with an engine 10, a diesel particulate filter (referred to hereinbelow as DPF) 20, a selective reduction catalyst (referred to hereinbelow as SCR) 30, a controller 40, and an antenna 50.

(1) Engine 10

The engine 10 is an internal combustion engine that serves as a driving source. In the present embodiment, the engine 10 is a diesel engine. Exhaust gas discharged from the engine 10 includes PM and $NO_X$, etc.

(2) DPF 20

The DPF 20 is an example of the "exhaust gas treatment device" according to the present embodiment. The DPF 20 is connected to the exhaust gas side of the engine 10. The DPF 20 captures PM included in the exhaust gas. The DPF 20 is removed from the work machine and requires periodic maintenance in order to remove clogging caused by the PM that cannot be removed by belowmentioned forced regeneration.

The DPF 20 that is subjected to periodic maintenance may be mounted in a work machine different from the one the DPF 20 was previously mounted in. In the present embodiment, a case assumed in which the DPF 20 that was mounted in the second work machine 2 is currently mounted in the first work machine 1.

The DPF 20 is provided with a case 21, a DOC 22, a catalyzed soot filter (referred to hereinbelow as CSF) 23, a temperature sensor 24, and a differential pressure sensor 25.

The case 21 houses the DOC 22 and the CSF 23. The temperature sensor 24 and the differential pressure sensor 25 are attached to the case 21.

The DOC 22 is a catalyst that oxidizes and heats a dosing fuel supplied as needed into the exhaust gas to increase the exhaust gas temperature to a predetermined high-temperature region. The heated exhaust gas is reused in forced regeneration of the belowmentioned CSF 23. A light oil that is the same as the engine fuel can be used, for example, as the dosing fuel. The dosing fuel is supplied into the exhaust gas from an unillustrated fuel injection device that is used for dosing, and flows into the DOC 22 along with the exhaust gas.

A Pt/Pd alloy can be used, for example, in the oxidation catalyst of the DOC 22. When the oxidation catalyst is exposed to high temperatures for a long time and is subjected to heat damage, the oxidation catalyst gradually agglomerates and the catalyzing performance is reduced.

The CSF 23 is a filter that captures the PM in the exhaust gas. The CSF 23 has a honeycomb structure that has multiple pores. The pores of the CSF 23 include inflow pores that are open to the inlet side and are sealed on the outlet side, and outflow pores that are sealed in the inlet side and are open to the outlet side. The inflow pores and the outflow pores are arranged alternately by means of barrier walls, and the exhaust gas that flows in through the inflow pores passes through the barrier walls and is allowed to leave through the outflow pores. The PM is captured by the barrier walls.

When the PM is deposited in the CSF 23, so-called forced regeneration is executed in which the exhaust gas heated by the DOC 22 is used to burn and remove the PM. Whether PM is deposited in the CSF 23 is determined by the controller 40 on the basis of measurement values of the differential pressure sensor 25.

A ceramic such as cordierite, silicon carbide, or the like, or a metal such as stainless steel, aluminum, or the like can be used as the material of the CSF 23, and the material is selected as appropriate according to need.

An oxidation catalyst (for example, Pt) of a different type than that of the DOC 22 is coated onto the inlet side of the CSF 23. Similarly, when the above oxidation catalyst is exposed to high temperatures for a long time and is subjected to heat damage, the oxidation catalyst gradually agglomerates and the catalyzing performance is reduced.

The temperature sensor 24 measures the exhaust gas temperature at the outlet side (downstream) of the CSF 23. The temperature sensor 24 outputs the measurement values to the controller 40.

The differential pressure sensor 25 has a first pressure sensor 251 and a second pressure sensor 252. The first pressure sensor 251 measures the exhaust gas pressure on the inlet side (upstream) of the CSF 23. The second pressure sensor 252 measures the exhaust gas pressure on the outlet side (downstream) of the CSF 23. The first pressure sensor 251 and the second pressure sensor 252 both output the respective measurement values to the controller 40.

(3) SCR 30

The SCR 30 is connected to the downstream side of the DPF 20. The SCR 30 reduces and purifies $NO_X$ in the exhaust gas using ammonia as the reducing agent. Because urea crystallizes and precipitates in the SCR 30, the heated exhaust gas is used to decompose the precipitate in the same way as the forced regeneration of the DPF 20.

(4) Controller 40

The controller 40 has a unique identification symbol storage unit 41, a temperature acquisition unit 42, a transmitting unit 43, and a forced regeneration execution unit 44.

The unique identification symbol storage unit 41 stores a current "DPF unique identification symbol," which represents the DPF 20 mounted in the host vehicle, and a "vehicle unique identification symbol" of the host vehicle.

The "DPF unique identification symbol" is represented, for example, by a character string (numbers and/or letters). The DPF unique identification symbol is a label for identifying each DPF 20. Therefore, the DPF unique identification symbol of the DPF 20 mounted in the first work machine 1 is different from the DPF unique identification symbol of the DPF 20 mounted in the second work machine 2.

The "vehicle unique identification symbol" is represented, for example, by a character string. The vehicle unique identification symbol is a label for identifying the respective work machines 1 and 2. Therefore, the vehicle unique identification symbol of the first work machine 1 is different from the vehicle unique identification symbol of the second work machine 2.

The temperature measurement values outputted by the temperature sensor 24 of the DPF 20 are inputted to the temperature acquisition unit 42. In the present embodiment, the temperature acquisition unit 42 acquires the temperature measurement values in intervals of a predetermined time period (for example, one minute). The temperature acquisition unit 42 then generates "temperature information" by compiling the temperature measurement values acquired at each predetermined time period, in a predetermined period (for example, 24 hours).

Figure 3:
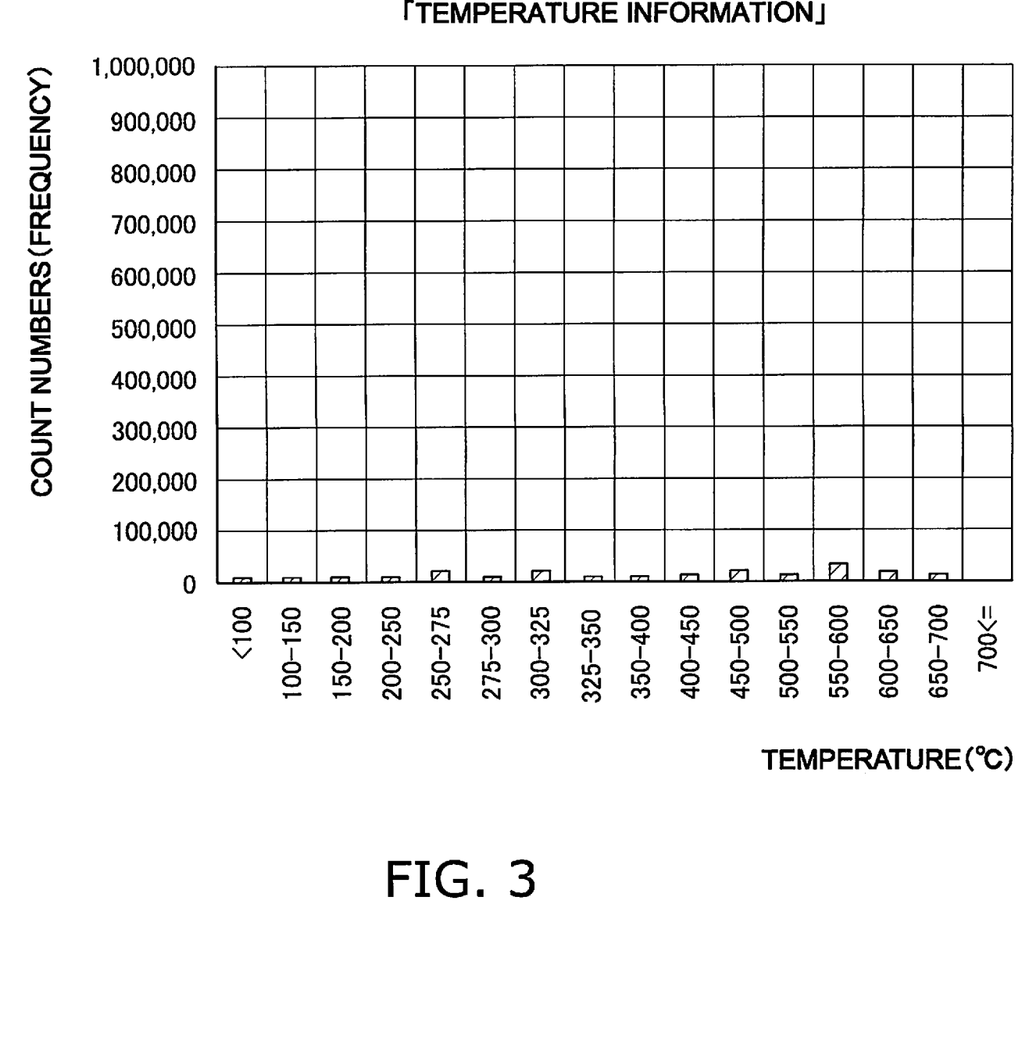
FIG. 3 is a histogram illustrating count numbers of temperature measurement values included in "temperature information."

FIG. 3 is a histogram which illustrates count numbers of temperature measurement values included in the "temperature information." The horizontal axis of the histogram represents temperature ranges divided into predetermined temperatures (50° C. in FIG. 3), and the vertical axis of the histogram represents count numbers of the temperature measurement values that belong to the respective temperature range.

The temperature acquisition unit 42 generates "unique temperature information" in which the "temperature information," the "DPF unique identification symbol," and the "vehicle unique identification symbol" are associated with each other.

The transmitting unit 43 transmits the "unique temperature information" generated by the temperature acquisition unit 42 from the antenna 50 through the GPS satellite 3 or the communication satellite 4 to the data server 5.

Pressure measurement values outputted by the respective first and second pressure sensors 251 and 252 of the DPF 20 are inputted to the forced regeneration execution unit 44. The forced regeneration execution unit 44 calculates the differential pressure of the pressure measurement values from the respective first and second pressure sensors 251 and 252. The forced regeneration execution unit 44 determines that clogging in the DPF 20 (specifically, the CSF 23) has occurred when the differential pressure of the pressure measurement values is equal to or higher than a predetermined value, and executes the forced regeneration of the DPF 20.

Specifically, the forced regeneration execution unit 44 supplies the dosing fuel to the exhaust gas discharged from the engine 10 when it is determined that clogging has occurred. As a result, the reaction heat obtained by oxidizing and heating the dosing fuel in the DOC 22 is fed into the CSF 23 and the PM deposited in the CSF 23 is burned and removed. Consequently, the CSF 23 is forcibly regenerated.

(5) Data Server 5

The data server 5 receives the "unique temperature information" transmitted by the respective first and second work machines 1 and 2. The "unique temperature information" is transmitted from the first and second work machines 1 and 2 at predetermined periods.

As indicated above, the "temperature information," which indicates the temperature measurement values compiled for each period, the "DPF unique identification symbol," and the "vehicle unique identification symbol" are associated with each other in the "unique temperature information."

The data server 5 generates "heat damage information" which indicates the extent of heat damage of each DPF 20 by compiling the "temperature information" associated with the "DPF unique identification symbol" for each "vehicle unique identification symbol."

Specifically, because the DPF 20 currently mounted in the first work machine 1 was previously mounted in the second work machine 2, the data server 5 generates "first heat damage information" compiled for the first work machine 1 and "second heat damage information" compiled for the second work machine 2 from the "temperature information" associated with the DPF 20 in the first work machine 1.

The "first heat damage information" indicates the extent of heat damage received while the DPF 20 currently mounted in the first work machine 1 is mounted in the first work machine 1. The "second heat damage information" indicates the extent of heat damage received while the DPF 20 currently mounted in the first work machine 1 was previously mounted in the second work machine 2.

Figure 4:
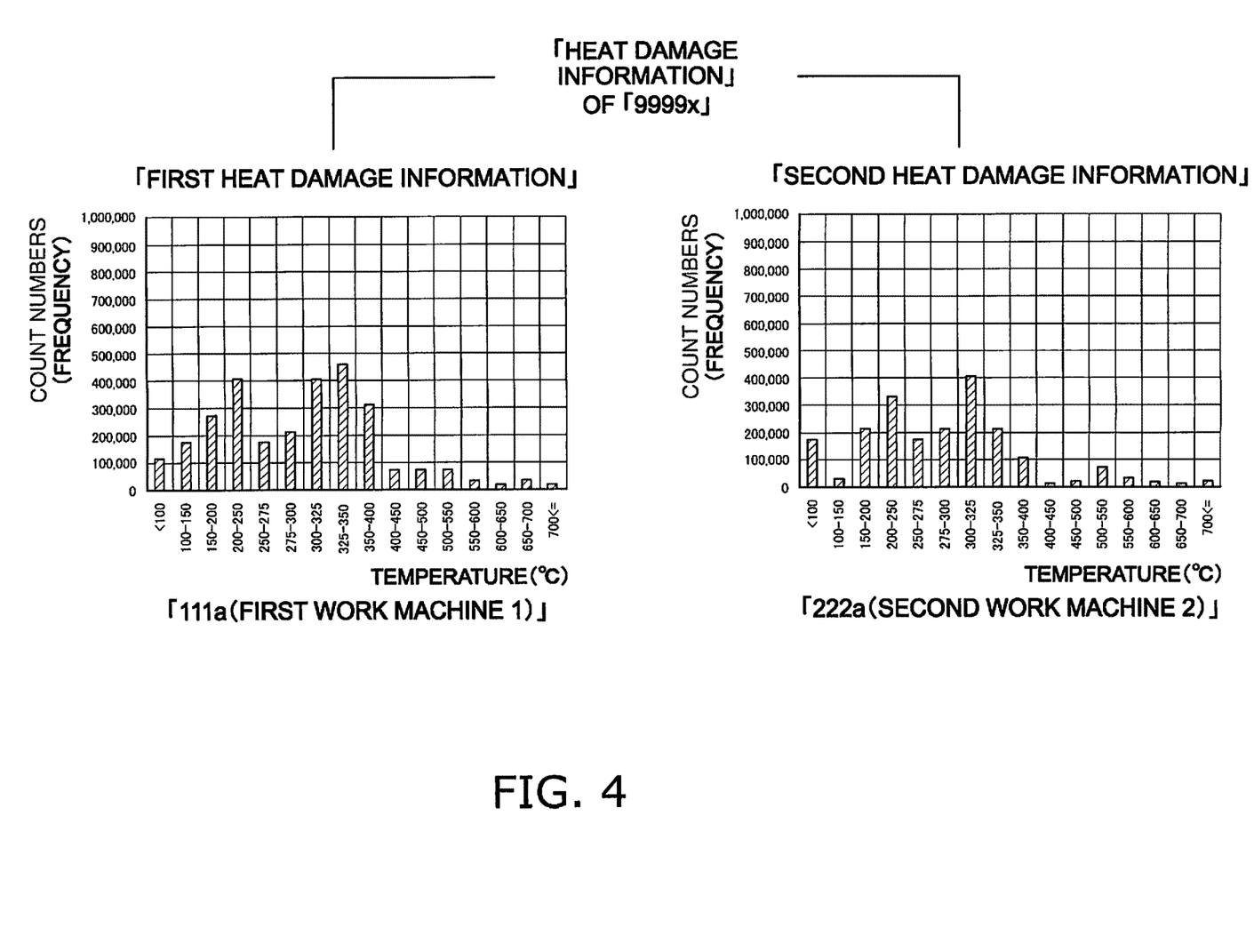
FIG. 4 is a histogram illustrating count numbers of temperature measurement values included in "first heat damage information" and "second heat damage information" of a diesel particulate filter mounted in a first work machine.

FIG. 4 is a histogram illustrating count numbers of temperature measurement values included in "first heat damage information" and "second heat damage information" of the DPF 20 currently mounted in the first work machine 1.

In FIG. 4, the "DPF unique identification symbol" of the DPF 20 currently mounted in the first work machine 1 is "9999x," the "vehicle unique identification symbol" of the first work machine 1 is "111a," and the "vehicle unique identification symbol" of the second work machine 2 is "222a."

(6) Terminal Computer 7

The terminal computer 7 is a terminal for determining whether to continue using the DPFs 20 mounted in the respective first and second work machines 1 and 2. The terminal computer 7 is connected to the data server 5 over the network 6.

Figure 5:
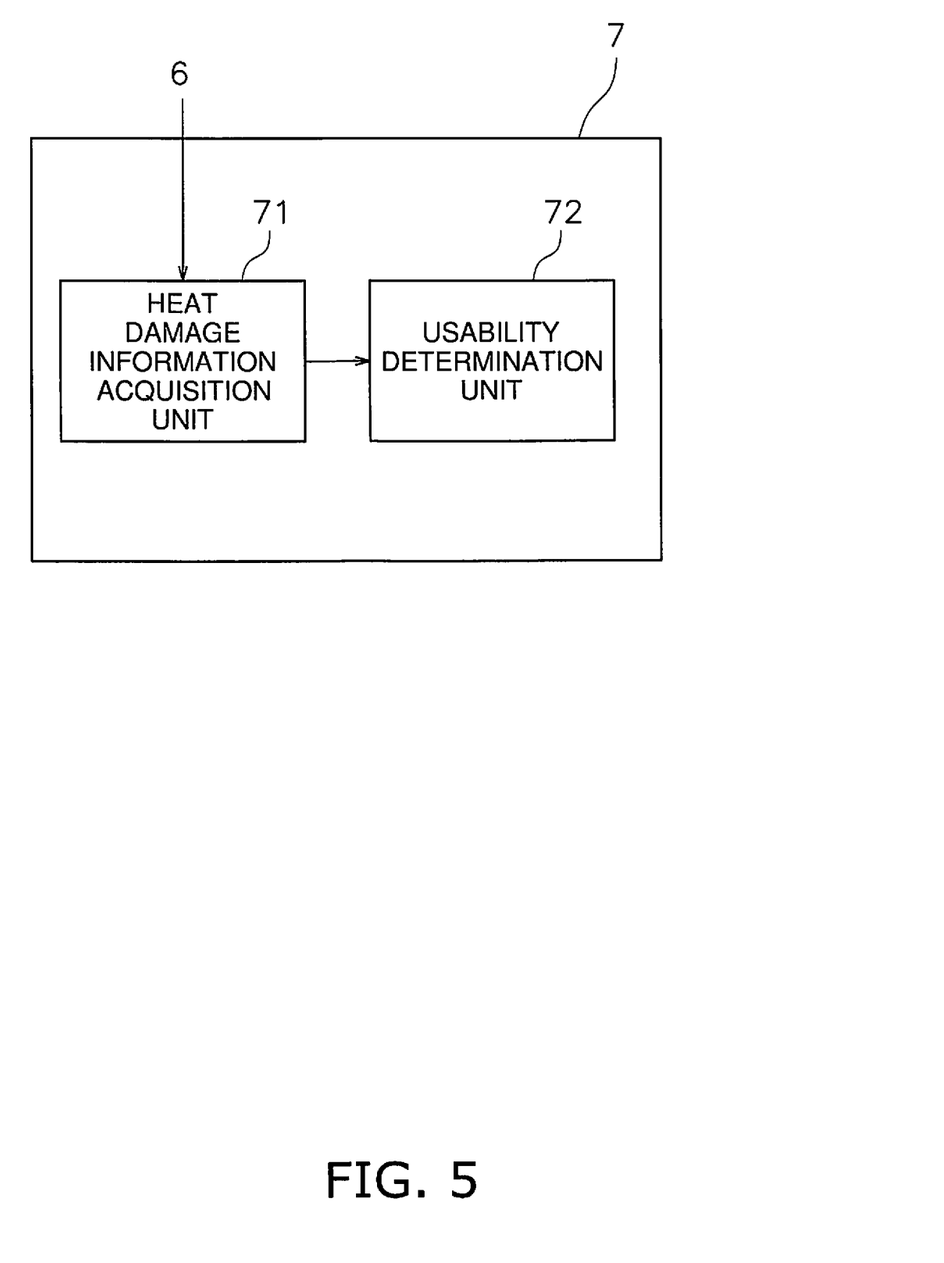
FIG. 5 is a schematic view illustrating a portion of a configuration of a terminal computer 7.

As illustrated in FIG. 5, the terminal computer 7 has a heat damage information acquisition unit 71 and a usability determination unit 72. In the present embodiment, the heat damage information acquisition unit 71 is an example of an "acquisition part," and the usability determination unit 72 is an example of a "determination part."

The heat damage information acquisition unit 71 acquires, on the basis of the "DPF unique identification symbol" of the DPF 20, the "heat damage information" which indicates the extent of heat damage on said DPF 20 which is the object of the determination of usability. The heat damage information acquisition unit 71 acquires "cumulative heat damage information" by accumulating the acquired "heat damage information" (acquisition step).

Figure 6:
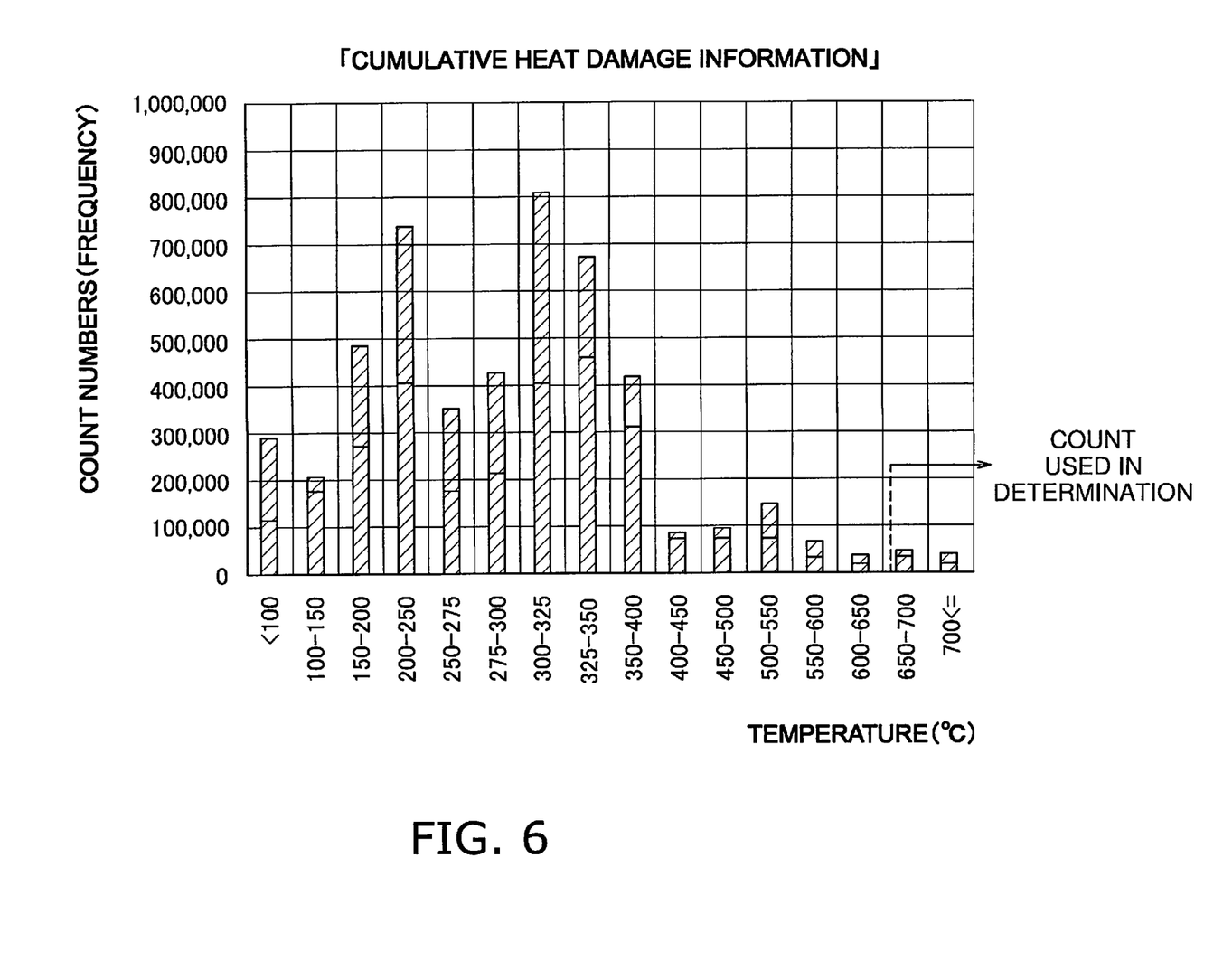
FIG. 6 is a histogram illustrating count numbers of temperature measurement values included in "cumulative heat damage information" of a diesel particulate filter mounted in a first work machine 1.

For example, when determining whether it is possible to continue to use the DPF 20 currently mounted in the first work machine 1, the heat damage information acquisition unit 71 acquires, from the data server 5, the "first heat damage information" and the "second heat damage information" associated with the "DPF unique identification symbol" of the DPF 20. The heat damage information acquisition unit 71 then acquires the "cumulative heat damage information" by accumulating, for each temperature range, the count numbers of the temperature measurement values included in the "first heat damage information" and the "second heat damage information." FIG. 6 is a histogram illustrating count numbers of temperature measurement values included in "first heat damage information" and "second heat damage information" of the DPF 20 currently mounted in the first work machine 1.

The usability determination unit 72 determines the usability of the DPF 20 on the basis of the "cumulative heat damage information" acquired by the heat damage information acquisition unit 71. For example, the usability determination unit 72 indexes the count numbers of the temperature measurement values included in the "cumulative heat damage information," and determines that the DPF 20 is unusable if the index value thereof is higher than a threshold, and determines that the DPF 20 is usable if the index value is not higher than the threshold. In this way, by using the "cumulative heat damage information," the extent of heat damage accumulated in each DPF 20 mounted in the respective first and second work machines 1 and 2 can be understood quantitatively, and it is possible to accurately determine the usability of the DPF 20.

In particular in the present embodiment, the "cumulative heat damage information" of the DPF 20 currently mounted in the first work machine 1 includes the "second heat damage information" which indicates the extent of heat damage received while mounted in the second work machine 2 as well as the "first heat damage information" which indicates the extent of heat damage received while mounted in the first work machine 1. Therefore, even if the DPF 20 has a history of being mounted in a different work machine, the current state of the extent of heat damage of the DPF 20 can be understood.

In addition, the usability determination unit 72 preferably determines the usability of the DPF 20 on the basis of the count numbers of temperature measurement values at or above a predetermined temperature among the temperature measurement values included in the "cumulative heat damage information." The predetermined temperature can be set to a temperature (for example, about 650° C. if the catalyst is Pt) at which there is a concern of the agglomeration of the catalyst used in each DPF 20. In this way, by using count numbers of temperature measurement values of a predetermined temperature or higher, the usability of the DPF 20 can be determined with greater accuracy because the extent of agglomeration of the catalyst in the DPF 20 can be understood.

Other Embodiments

While the DPF 20 in the above embodiment includes the DOC 22 and the CSF 23, the present invention is not limited in this way. The DPF 20 may have at either one of the DOC 22 and the CSF 23.

While the determination system 100 of the above embodiment is provided with the first work machine 1 and the second work machine 2, the present invention is not limited in this way. The determination system 100 may be provided with three or more work machines.

While temperature measurement values less than a predetermined temperature at which there is a concern of agglomeration of the catalyst, are included in the "cumulative heat damage information" in the above embodiment, the present invention is not limited in this way. The usability determination unit 72 may not include temperature measurement values less than the predetermined temperature in the "cumulative heat damage information" when determining the usability of the DPF 20 on the basis of the count numbers of temperature measurement values at or above the predetermined temperature among the temperature measurement values included in the "cumulative heat damage information."

While temperature measurement values measured by the temperature sensor 24 are included in the "cumulative heat damage information" in the above embodiment, the present invention is not limited in this way. So long as the "cumulative heat damage information" indicates the heat damage of the DPF 20, the frequency of forced regeneration of the DPF 20 may be used, for example, in place of the temperature measurement values. In this case, the usability determination unit 72 may determine that the DPF 20 is unusable if the frequency of the forced regeneration is greater than a threshold frequency, and may determine that the DPF 20 is usable if the frequency of the forced regeneration is not greater than the threshold frequency.

While the temperature sensor 24 measures the exhaust gas temperature at the outlet side of the CSF 23 in the above embodiment, the temperature sensor 24 may measure the exhaust gas temperature at the inlet side of the CSF 23 or may measure the exhaust gas temperature at the inlet side of the DOC 22.

The invention claimed is:

1. A determination method for an exhaust gas treatment device mounted in a work machine and having at least one of a diesel oxidation catalyst and a catalyzed soot filter, the determination method comprising:
    using a controller mounted on the work machine to
        receive temperature measurement values outputted from a temperature sensor arranged to measure a temperature of exhaust gas at the exhaust gas treatment device,
        generate unique temperature information that includes temperature information based on the temperature measurement values and a unique identification symbol of the exhaust gas treatment device, the temperature information and the unique identification symbol of the exhaust gas treatment device being associated with each other, and
        transmit the unique temperature information to a data server that is remote with respect to the work machine;
    using the data server to generate heat damage information indicating an extent of heat damage of the exhaust gas treatment device; and
    using a terminal computer to
        acquire the heat damage information from the data server and generate cumulative heat damage information by accumulating the heat damage information, and
        determining a usability of the exhaust gas treatment device based on the cumulative heat damage information.

2. The determination method for an exhaust gas treatment device according to claim 1, wherein
    the generating the unique temperature information is executed such that the unique temperature information further includes a unique identification symbol of the work machine in which the exhaust gas treatment device is installed, the unique identification symbol of the work machine being associated with the temperature information and the unique identification symbol of the exhaust gas treatment device,
    the generating the heat damage information includes
        generating first heat damage information indicating an extent of heat damage received while the exhaust gas treatment device is mounted in a first work machine, and
        generating second heat damage information indicating an extent of heat damage received while the exhaust gas treatment device is mounted in a second work machine, and
    the generating the cumulative heat damage information is achieved by
        acquiring the first heat damage information,
        acquiring the second heat damage information, and
        accumulating the first heat damage information and the second heat damage information.

3. A determination system for an exhaust gas treatment device mounted in a work machine and having at least one of a diesel oxidation catalyst and a catalyzed soot filter, the determination system comprising:
    a temperature sensor arranged and configured to measure a temperature of exhaust gas at the exhaust gas treatment device;
    a controller mounted on the work machine, the controller being configured to
        receive temperature measurement values outputted from the temperature sensor,
        generate unique temperature information that includes temperature information based on the temperature measurement values and a unique identification symbol of the exhaust gas treatment device, the temperature information and the unique identification symbol of the exhaust gas treatment device being associated with each other, and
        transmit the unique temperature information;
    a data server that is remote with respect to the work machine, the data server being configured to receive the unique temperature information transmitted from the controller and generate heat damage information indicating an extent of heat damage of the exhaust gas treatment device; and a terminal computer configured to
acquire the heat damage information from the data server and generate cumulative heat damage information by accumulating the heat damage information; and
determine a usability of the exhaust gas treatment device based on the cumulative heat damage information.

4. The determination system for an exhaust gas treatment device according to claim 3, wherein
the controller is further configured to generate the unique temperature information to include a unique identification symbol of the work machine in which the exhaust gas treatment device is installed, the unique identification symbol of the work machine being associated with the temperature information and the unique identification symbol of the exhaust gas treatment device,
the data server is further configured to generate the heat damage information to include
first heat damage information indicating an extent of heat damage received while the exhaust gas treatment device is mounted in a first work machine, and
second heat damage information indicating an extent of heat damage received while the exhaust gas treatment device is mounted in a second work machine, and
the terminal computer is further configured to
acquire the cumulative heat damage information by acquiring the first heat damage information and the second heat damage information based on the association of the unique identification symbol of the exhaust gas treatment device and the unique identification symbols of the first work machine and the second work machine, and
accumulate the first heat damage information and the second heat damage information.

* * * * *